United States Patent
Guo et al.

(10) Patent No.: US 11,306,698 B2
(45) Date of Patent: Apr. 19, 2022

(54) PITCH APPARATUS AND WIND TURBINE HAVING PITCH APPARATUS

(71) Applicant: BEIJING GOLDWIND SCIENCE & CREATION WINDPOWER EQUIPMENT CO., LTD., Beijing (CN)

(72) Inventors: Yongjun Guo, Beijing (CN); Chunmei Yuan, Beijing (CN); Xingwen Dai, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 916 days.

(21) Appl. No.: 16/069,069

(22) PCT Filed: Dec. 25, 2017

(86) PCT No.: PCT/CN2017/118244
§ 371 (c)(1),
(2) Date: Jul. 10, 2018

(87) PCT Pub. No.: WO2019/019542
PCT Pub. Date: Jan. 31, 2019

(65) Prior Publication Data
US 2021/0207581 A1  Jul. 8, 2021

(30) Foreign Application Priority Data

Jul. 28, 2017  (CN) .......................... 201710631152.5

(51) Int. Cl.
*F03D 7/02*      (2006.01)
*F03D 15/00*    (2016.01)
(Continued)

(52) U.S. Cl.
CPC ......... *F03D 7/0224* (2013.01); *F03D 1/0658* (2013.01); *F03D 7/024* (2013.01);
(Continued)

(58) Field of Classification Search
CPC ...... F03D 7/0224; F03D 7/024; F03D 1/0658; F03D 80/70; F05B 2260/76; F05B 2260/74; F05B 2260/79
See application file for complete search history.

(56) References Cited

U.S. PATENT DOCUMENTS 8,684,693 B2 *  4/2014  Mascioni ............. F03D 7/0224
                                                                416/162
2007/0231137 A1  10/2007  Nitzpon
(Continued)

FOREIGN PATENT DOCUMENTS

CN   101230838 A   7/2008
CN   101424249 A   5/2009
(Continued)

OTHER PUBLICATIONS

English machine translation of CN 107165777A, Jun. 30, 2021.*
(Continued)

*Primary Examiner* — Christopher Verdier

(57) ABSTRACT

Provided is a pitch apparatus of a wind turbine. The wind turbine includes a wheel hub and multiple blades. The pitch apparatus includes a pitch bearing, a transmission element and a driving mechanism for driving the transmission element. The pitch bearing includes a bearing inner race and a bearing outer race. The bearing inner race is fixedly connected to the blade; the bearing outer race is fixedly connected to the wheel hub. The transmission element is driven by the driving mechanism, and drives the blade and the bearing inner race to rotate relative to the wheel hub. A load level of ultimate bending moment for a blade root and a
(Continued)

safety factor of the pitch apparatus increase, failure risks of the pitch bearing, bolts and the transmission belt are reduced. A wind turbine having pitch apparatus is provided.

20 Claims, 13 Drawing Sheets

(51) Int. Cl.
  *F03D 80/70* (2016.01)
  *F03D 1/06* (2006.01)
(52) U.S. Cl.
  CPC ............ *F03D 15/00* (2016.05); *F03D 80/70* (2016.05); *F05B 2260/74* (2013.01); *F05B 2260/76* (2013.01); *F05B 2260/79* (2013.01)

(56) References Cited

U.S. PATENT DOCUMENTS

| | | | |
|---|---|---|---|
| 2013/0216394 A1 | 8/2013 | Leonard | |
| 2014/0003946 A1* | 1/2014 | Moore | F03D 80/00 416/174 |

FOREIGN PATENT DOCUMENTS

| | | | |
|---|---|---|---|
| CN | 202370752 U | 8/2012 | |
| CN | 203383979 U | 1/2014 | |
| CN | 103953504 A | 7/2014 | |
| CN | 104533728 A | 4/2015 | |
| CN | 105673318 A | 6/2016 | |
| CN | 106594065 A | 4/2017 | |
| CN | 206290366 U | 6/2017 | |
| CN | 107165777 A | 9/2017 | |
| CN | 107201990 A | 9/2017 | |
| EP | 2679805 A1 | 1/2014 | |
| TW | 104533728 A * | 4/2015 | ............ F03D 7/024 |
| WO | 2013/156497 A1 | 10/2013 | |
| WO | 2015/021994 A1 | 2/2015 | |

OTHER PUBLICATIONS

English machine translation of CN 101424249A, Jun. 30, 2021.*
English machine translation of WO 2013/156497A1, Jun. 30, 2021.*
English machine translation of CN 104533728A, Jun. 30, 2021.*
English machine translation of CN 105673318A, Jun. 30, 2021.*
English machine translation of CN 101230838A, Jun. 30, 2021.*
English machine translation of CN 202370752U, Jun. 30, 2021.*
International Search Report dated Mar. 1, 2018; PCT/CN2017/118244.
Extended European Search Report dated Oct. 30, 2019, Appln. No. 17890842.2.
First Australian Office Action dated Mar. 15, 2019; Appln. No. 2017391882.

* cited by examiner

PITCH APPARATUS AND WIND TURBINE HAVING PITCH APPARATUS

CROSS-REFERENCE TO RELATED APPLICATIONS

The present application is a national phase of international application No. PCT/CN2017/118244 filed on Dec. 25, 2017, which claims priority to Chinese Patent Application No. 201710631152.5, titled "PITCH APPARATUS AND WIND TURBINE HAVING PITCH APPARATUS", filed on 28 Jul. 2017 with the State Intellectual Property Office of People's Republic of China, both of which are incorporated herein by reference in their entirety.

FIELD

The present disclosure relates to the technical field of wind power generation, and in particular to a pitch apparatus of a wind turbine and a wind turbine having the pitch apparatus.

BACKGROUND

A wind turbine is a large power generator apparatus, which converts wind energy into electric energy by a rotation of an impeller. In the wind turbine, a pitch apparatus is for adjusting a blade angle according to a change of a wind speed, so as to control an absorption of the wind energy by the impeller.

Specifically, during a normal operation of the wind turbine, and in a case that the wind speed exceeds a rated wind speed of the wind turbine, the blade angles are controlled to be within a range from 0° to 30° by the pitch apparatus so as to control an output of the wind turbine, thereby guaranteeing that a speed of the impeller is limited in a rated range. In addition, parking of the wind turbine may be achieved, for example, by the pitch apparatus adjusting the blade to be in a feathering position of 90°.

FIG. 1 shows a schematic diagram of a pitch apparatus according to the conventional technology. FIG. 2 shows a partial sectional side view of the pitch apparatus according to FIG. 1. As shown in FIGS. 1 and 2, the pitch apparatus includes a pitch bearing 2. The pitch bearing 2 includes a bearing inner race 21 and a bearing outer race 22. A wheel hub 1, which serves as a base body of the wind turbine, is fixedly connected to the bearing inner race 21 of the pitch bearing 2 by a wheel hub connection bolt 7. A blade 6 of the wind turbine is fixedly connected to the bearing outer race 22 of the pitch bearing 2 by a blade connection bolt 8. A transmission belt 3 passes through a driving mechanism 4, a tensioning wheel 31 and a transmission belt pre-tensioning device 32 and is connected to an outer circumferential cylinder surface of the bearing outer race 22 of the pitch bearing 2 with tension. When it is required to perform a pitch operation, the driving mechanism 4 drives the transmission belt 3, so that the bearing outer race 22 of the pitch bearing 2 and the blade 6 of the wind turbine are driven to rotate in relative to the bearing inner race 21 of the pitch bearing 2 and the wheel hub 1 of the wind turbine, so as to achieve a pitch of the blade.

However, the pitch apparatus according to the conventional technology may suffer from a failure caused by a low safety factor of the pitch bearing races, a low safety factor of the pitch bearing, a low safety factor of the wheel hub connection bolt and a low safety factor of the transmission belt.

SUMMARY

In order to addresses the above issues of the conventional technology, a pitch apparatus of a wind turbine and a wind turbine having the pitch apparatus are provided in the present disclosure. The pitch apparatus can improve safety factors of components of the pitch apparatus and a safety performance of the pitch apparatus.

According to an aspect of the present disclosure, a pitch apparatus of a wind turbine is provided. The wind turbine may include a wheel hub and multiple blades. The pitch apparatus may include a pitch bearing, a transmission element and a driving mechanism for driving the transmission element. The pitch bearing includes a bearing inner race and a bearing outer race, where the bearing inner race is fixedly connected to the blade, the bearing outer race is fixedly connected to the wheel hub, the transmission element is driven by the driving mechanism drives the blade and the bearing inner race to rotate in relative to the wheel hub.

According to an aspect of the disclosure, a wind turbine is provided. The wind turbine includes the pitch apparatus described above.

According to the pitch apparatus of the wind turbine provided in the embodiment of the present disclosure, in a case that the blades have a same specification, by increasing a size of a pitch bearing, that is for performing an inner race pitch through an inner race connection plate, a pitch diameter of the bolt increases accordingly, the number of bolts increases, and a distribution diameter of the transmission element increases, so that an anti-load capacity of the blade root increases, a load on a single bolt and a load on the bearing roller decrease.

In this case, according to the pitch apparatus of the wind turbine provided in the embodiment of the present disclosure, a load level of an ultimate bending moment for a blade root increases, a safety factor of the pitch bearing and a safety factor of the connection bolt increase, a safety factor of the pitch bearing inner race, a safety factor of the pitch bearing outer race and a safety factor of the transmission element increase.

BRIEF DESCRIPTION OF THE DRAWINGS

The above objectives and/or other objectives and advantages of this disclosure will be described clearly hereinafter in conjunction with the drawings and the embodiments.

DETAILED DESCRIPTION OF EMBODIMENTS

In a pitch apparatus according to the conventional technology, a blade is connected to a bearing outer race of a pitch bearing, so that a solution of an outer race pitch is adopted. Therefore, there is an issue of a low safety factor of the pitch apparatus. In order to address the above issue, a solution of an inner race pitch, which is different from the outer race pitch method of the conventional technology, is adopted in the present disclosure, so that the blade is connected to the bearing inner race of the pitch bearing. The blade and the bearing inner race are driven by a transmission element (e.g. a transmission belt) to rotate in relative to the bearing outer race and a wheel hub at a predetermined angle, so as to achieve a rotation pitch of the blade. Compared with the solution of the outer race pitch according to the conventional technology, in a case that the blades have a same specification, that is, a diameter of a blade root is unchanged, since the blade root is connected to the bearing inner race, a size of the bearing inner race and a size of the bearing outer race should be increased, a diameter of a flange for connecting the wheel hub should be increased accordingly, and a pitch diameter of a bearing roller, a distribution diameter of a transmission element and a diameter of a connection bolt should also be increased accordingly, thereby improving safety factors of components of the pitch apparatus and improving a safety performance of the pitch apparatus.

For the solution of the inner race pitch provided in the present disclosure, multiple exemplary embodiments that achieve a connection between the blade and the bearing inner race and a connection between the blade and the transmission element are provided in the specification. Hereinafter, the specific embodiments of the present disclosure are described in detail in conjunction with the drawings.

First Embodiment

Figure 3:
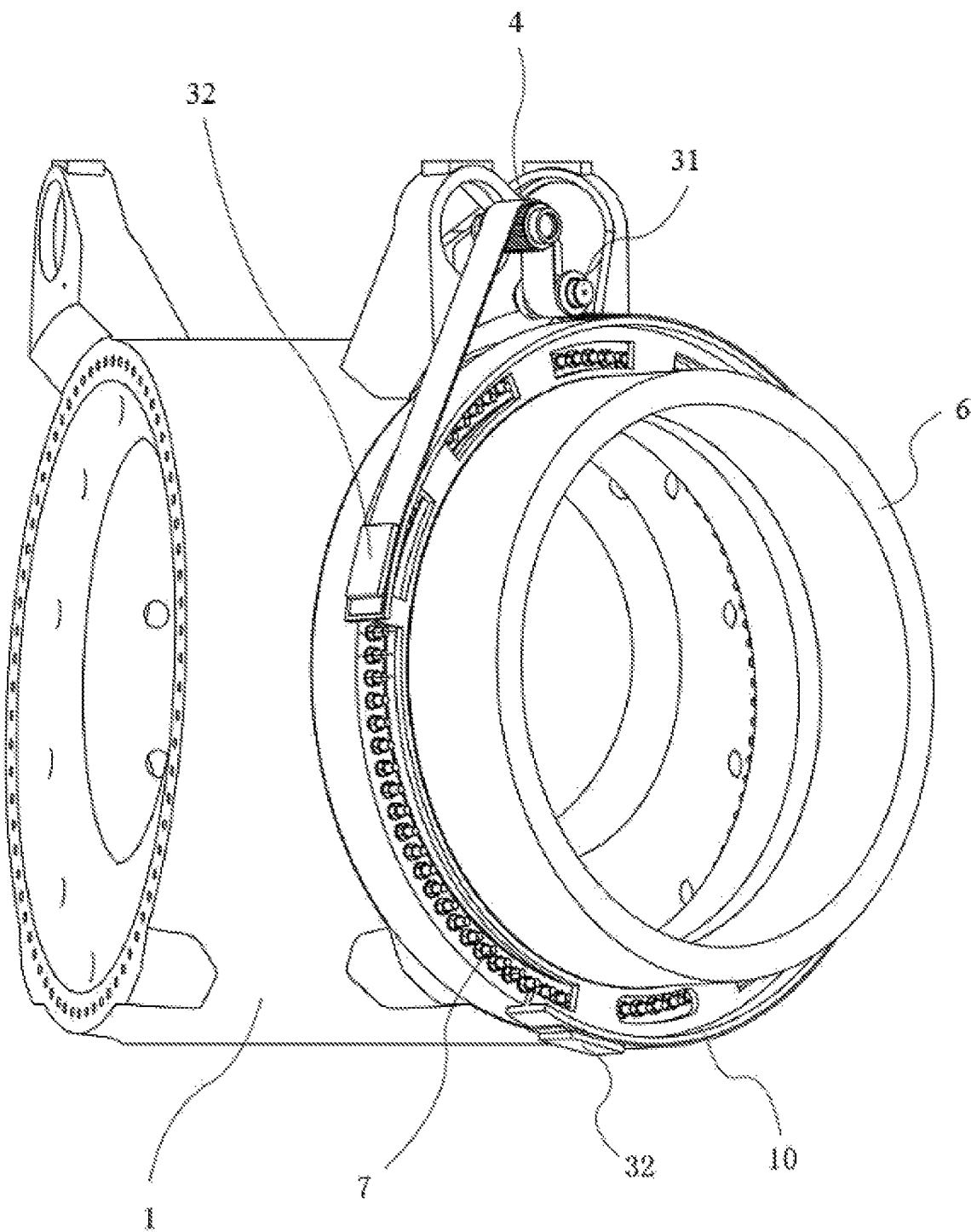
FIG. 3 is a perspective view of a pitch apparatus according to a first embodiment of the present disclosure.
Figure 4:
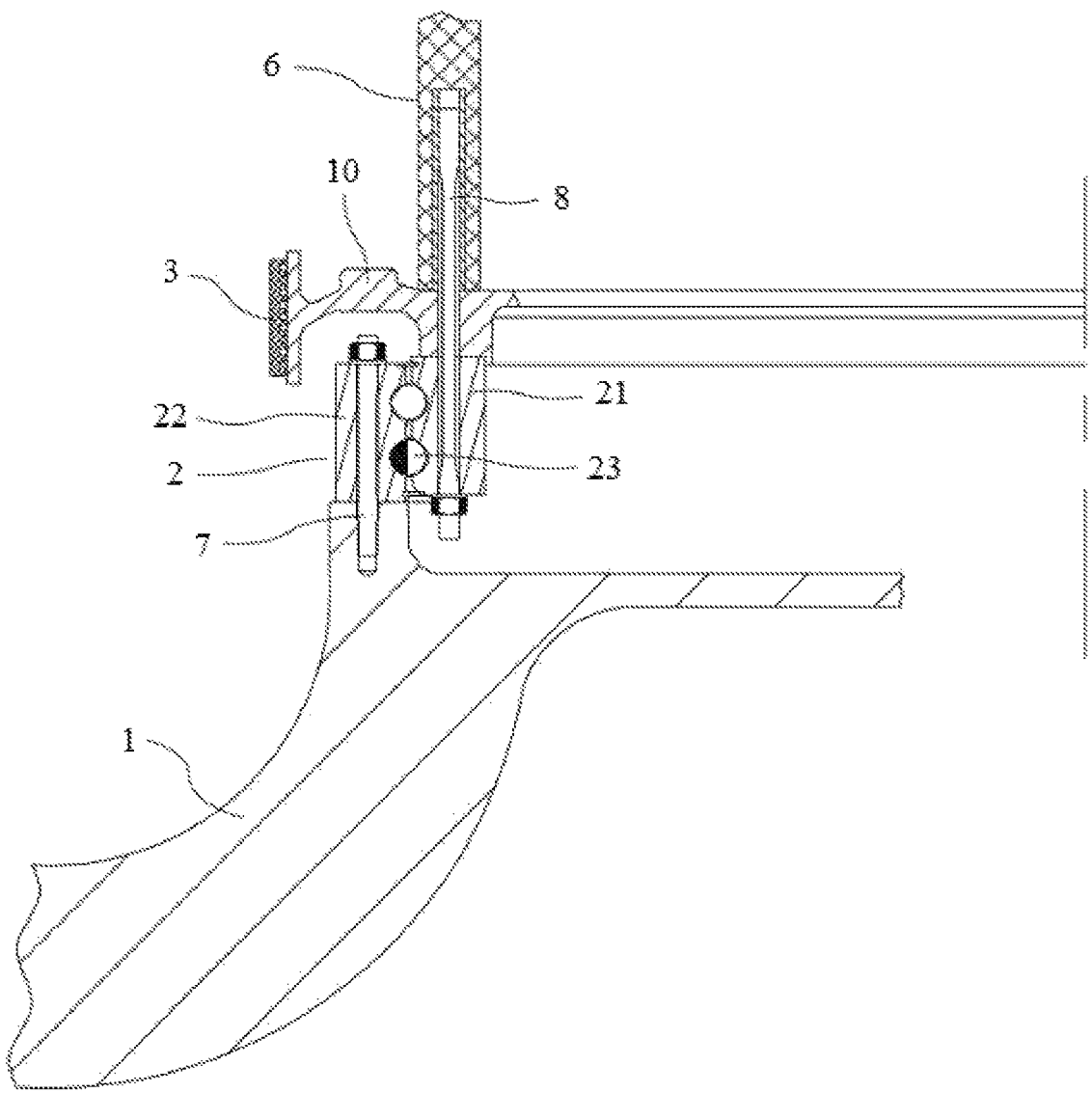
FIG. 4 is a partial sectional view of the pitch apparatus according to the first embodiment of the present disclosure.
Figure 5:
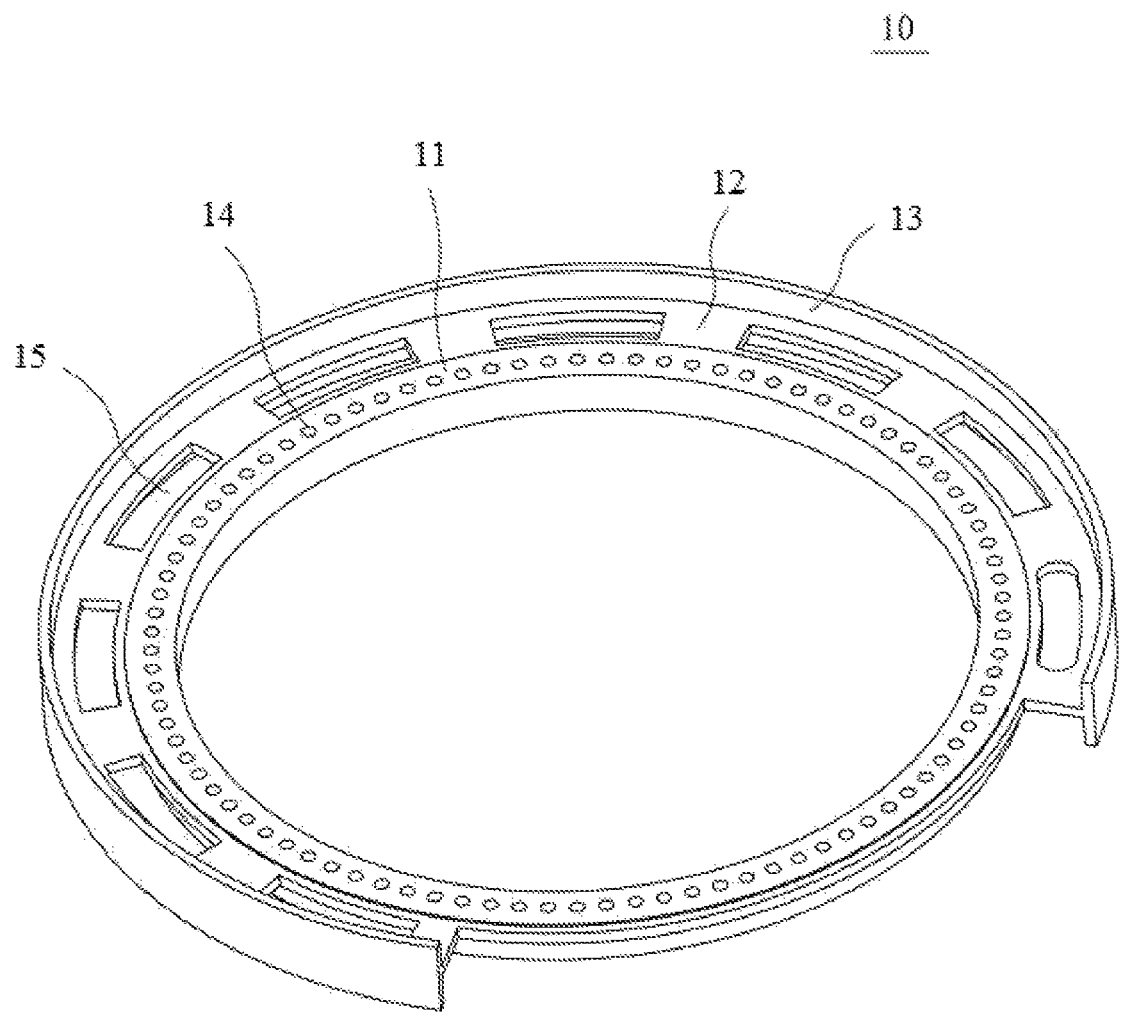
FIG. 5 is a perspective view of a connection plate of the pitch apparatus according to the first embodiment of the present disclosure.

FIG. 3 is a perspective view of a pitch apparatus according to a first embodiment of the present disclosure. FIG. 4 is a partial sectional view of the pitch apparatus according to the first embodiment of the present disclosure. FIG. 5 is a perspective view of a connection plate of the pitch apparatus according to the first embodiment of the present disclosure.

As shown in FIGS. 3 and 4, a pitch apparatus is provided in a first embodiment of the present disclosure. The pitch apparatus includes: a pitch bearing 2, a connection plate 10, a driving mechanism 4 and a transmission element. The pitch bearing 2 includes a bearing inner race 21, a bearing outer race 22 and a rolling element 23 (e.g., a ball or a pin roller) arranged between the bearing inner race 21 and the bearing outer race 22. The bearing outer race 22 is sleeved on a periphery of the bearing inner race 21, and can rotate in relative to the bearing inner race 21. The bearing outer race 22 may be fixedly connected to a wheel hub 1 by a bearing outer race connection bolt 7. The bearing inner race 21 may be fixedly connected to a blade 6 by a bearing inner race connection bolt 8. The connection plate 10 is located between the bearing inner race 21 and the blade 6.

A transmission manner between the driving mechanism 4 and the transmission element may be a belt transmission, a chain transmission, a winching transmission, a steel rope transmission, etc. Correspondingly, the transmission element may be a transmission belt, a transmission chain, a steel rope, etc., as long as a driving force can be transferred to the blade 6 to make the blade 6 rotate. Hereinafter, the transmission belt is taken as an example for illustration.

In a case where the pitch apparatus is installed on the wind turbine, the bearing outer race 22 is fixedly connected to the wheel hub 1 of the wind turbine, the connection plate 10 is fixedly connected between the bearing inner race 21 and the blade 6. Specifically, an axial first end of the connection plate 10 is connected to the bearing inner race 21, an axial second end of the connection plate 10 is connected to a blade root of the blade 6. On a position corresponding to a through hole for flange connection of the bearing inner race 21, the connection plate 10 is provided with an axial through holes 14 corresponding thereto (which will be described in detail hereinafter). The bearing inner race connection bolt 8 passes through the through hole of the bearing inner race 21 and the through hole of the connection plate 10 in the sequence listed. Then, the bearing inner race connection bolt 8 is screwed in a threaded blind hole in the blade root of the blade 6, so that the bearing inner race 21, the connection plate 10 and the blade 6 are fixedly connected by fastening a locknut. The driving mechanism 4 is arranged on the wheel hub 1 of the wind turbine. The transmission belt 3 passes over the driving mechanism 4 and is sleeved on a periphery of the connection plate 10. Two ends of the transmission belt 3 are pre-tensioned to an outer circumferential surface of the connection plate 10 by a pre-tensioning device 32. When it is required to adjust a blade angle of the blade 6, the driving mechanism 4 operates. The transmission belt 3 is driven by the driving mechanism 4, and drives the connection plate 10, the bearing inner race 21 and the blade 6 to rotate a predetermined angle in relative to the bearing outer race 22 and the wheel hub 1, so as to realize a pitch of the blade 6.

In an embodiment of the present disclosure, the driving mechanism 4 consists of a pitch driving gear. The pitch apparatus may further include a tensioning wheel 31. The transmission belt 3 is tensioned to the periphery of the connection plate 10 by the tensioning wheel 31 and the pitch driving gear 4.

As shown in FIGS. 3 to 5, in an embodiment of the present disclosure, the connection plate 10 is a ring-shaped plate structure. To facilitate an illustration for the structure of the connection plate 10, the connection plate 10 may be divided into an inner circumferential portion 11, an outer circumferential portion 13 and a middle transition portion 12 connecting the inner circumferential portion 11 and the outer circumferential portion 13, which are arranged in a radial direction.

As shown in FIG. 5, the inner circumferential portion 11 is provided with multiple first axial through holes 14 extending in an axial direction and evenly distributed in a circumferential direction. The bearing inner race 21 is provided with multiple second axial through holes (which may be threaded holes) corresponding to the multiple first axial through holes 14. Multiple threaded holes corresponding thereto, which may be blind holes, are provided with the blade root of the blade 6. When connecting the bearing inner race 21, the connection plate 10 and the blade 6, the bearing inner race 21, the connection plate 10 and the blade 6 are coaxially aligned, and the threaded holes or the through holes thereof are also coaxially aligned correspondingly in the axial direction. The bearing inner race connection bolt 8 passes through the second through hole of the bearing inner race 21 and the first through hole of the connection plate 10 in the sequence listed, then the bearing inner race connection bolt 8 is screwed in the threaded hole in the blade root of the blade 6, and is fastened by a nut, thereby realizing a fixed connection between the blade 6 of the wind turbine and the bearing inner race 21 of the pitch bearing 2 (as shown in FIGS. 3 and 4).

In addition, in an embodiment, the bearing outer race 22 is provided with multiple threaded holes or multiple through holes. By the bearing outer race connection bolt 7 passing through the bearing outer race 22 and being fastened to corresponding threaded holes of the wheel hub 1 of the wind turbine, a fixed connection between the bearing outer race 22 and the wheel hub 1 of the wind turbine is realized.

In addition to the manner of arranging the threaded holes on the root of the blade 6, a loop of studs may be pre-embedded on the root of the blade 6, where the studs are arranged on the root of the blade 6 in a circumferential direction. When the blade 6 is connected to the connection plate 10 and the bearing inner race 21, the studs of the blade 6 pass through the first axial through hole 14 of the connection plate 10 and the second axial through hole of the bearing inner race 21, and then are fastened by a nut.

Since the transmission belt 3 is of a certain width, in order to meet installation requirements of the transmission belt 3, a surface axial thickness of the outer circumferential portion 13 of the connection plate 10 that is connected to the transmission belt 3 should be greater than or equal to a width of the transmission belt 3, therefore, the outer circumferential portion 13 of the connection plate 10 may be formed with a certain thickness. Also, in order to meet strength requirements of a bolt connection between the blade 6 and the bearing inner race 21, a thickness of the inner circumferential portion 11 of the connection plate 10 that is connected to the bearing inner circumferential connection bolt 8 may also be large.

In order to reduce a weight of the connection plate 10 and save a cost, the outer circumferential portion 13 of the connection plate 10 may be formed as a non-complete ring structure. For example, the inner circumferential portion 11 is a complete ring structure, and the middle transition portion 12 and the outer circumferential portion 13 are formed as the non-complete ring structure which is a portion of a ring. Due to that the structure of the connection plate 10 can meet winding requirements of the transmission belt 3, since the pitch angle of the blade 6 is in a range of 0° to 30° during an actual pitch process of the blade 6, and the transmission belt 3 only wind around a partial circumference of the connection plate 10 using a winding angle of the transmission belt 3 shown in FIG. 3. In the embodiment, the outer circumferential portion of the connection plate 10 is designed as the non-complete ring structure, so as to save a material cost and reduce a weight of the connection plate 10. Apparently, in an actual implementation, the connection plate 10 may also be designed as the complete ring structure based on an actual requirement.

In addition, the middle transition portion 12 may be a spoke structure, in other words, multiple lightening holes 15, which are separated from each other, are arranged in the middle transition portion 12 of the connection plate 10, so as to further reduce the weight of the connection plate 10.

In addition to the above structure, the middle transition portion 12 may be thinner as long as installation requirements and strength requirements can be met, so that an axial thickness of the middle transition portion 12 may be smaller than or equal to an axial thickness of the inner circumferential portion 11, or an axial thickness of the middle transition portion 12 may be smaller than or equal to an axial thickness of the inner circumferential portion 11 and the outer circumferential portion 13, thereby further reducing the weight of the connection plate 10. In this case, the inner circumferential portion 11 and the outer circumferential portion 13 are generally cylindrical. A shape of a cross section that is intercepted in the radial direction of the connection plate 10 may be approximately a shape of "H" or "Z".

In the present disclosure, there are not specific limitations for the radial width and the axial thickness of the portions of the connection plate 10, as long as there is no interference among the connection plate 10, the bearing outer race 22 and the bearing outer race connection bolts 7 in and after the installation process.

When installing the pitch apparatus and the wind turbine according to the embodiment, the following method may be used. First, the bearing outer race 22 is fixedly connected to the wheel hub 1 of the wind turbine by the bearing outer race connection bolt 7. Then, the connection plate 10 is arranged at a right position, and the bearing inner race 21 is fixed connected to the connection plate 10 and the blade 6 of the wind turbine by the bearing inner race connection bolt 8. By such an installation sequence, the interference between the outer race connection bolt 7 and the connection plate 10 can be avoided.

In the exemplary embodiment of the present disclosure, a transmission between the periphery of the connection plate 10 and the transmission belt 3 are performed by friction. Based on the requirement, a corresponding anti-friction processing or a friction enhancement processing may be performed on the outer circumferential surface of the connection plate 10 to change a friction coefficient of a mating surface, so as to meet transmission requirements of different transmission belts and to avoid a slipping risk between the transmission belt 3 and the connection plate 10.

The transmission belt 3 may be a toothed belt or a toothed chain, etc. In a case where the transmission belt 3 is the toothed belt or the toothed chain, a toothed structure may further be arranged on the outer circumferential surface of the connection plate 10, so as to match the toothed belt or the toothed chain.

Second Embodiment

Figure 6A:
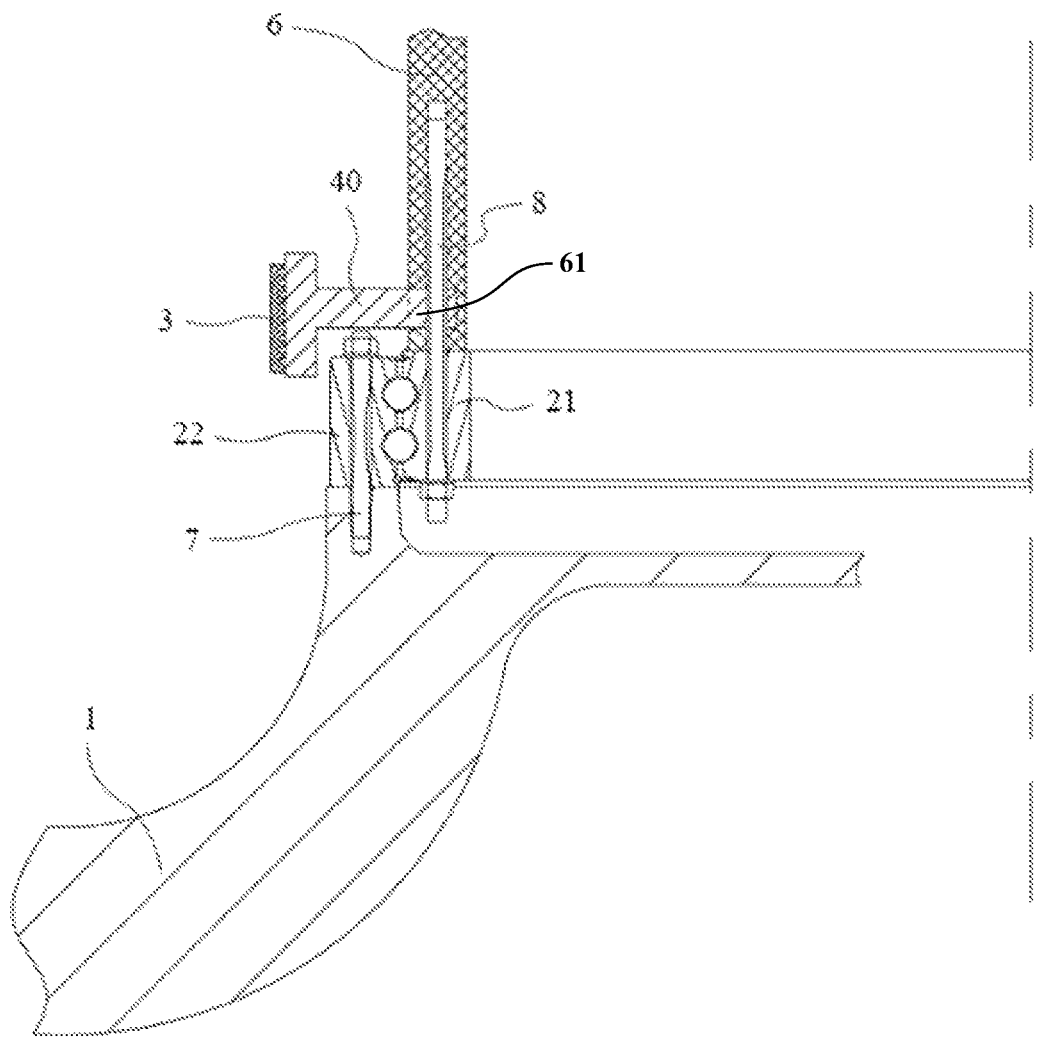
FIG. 6A is a partial sectional view of a pitch apparatus according to a second embodiment of the present disclosure.
Figure 6B:
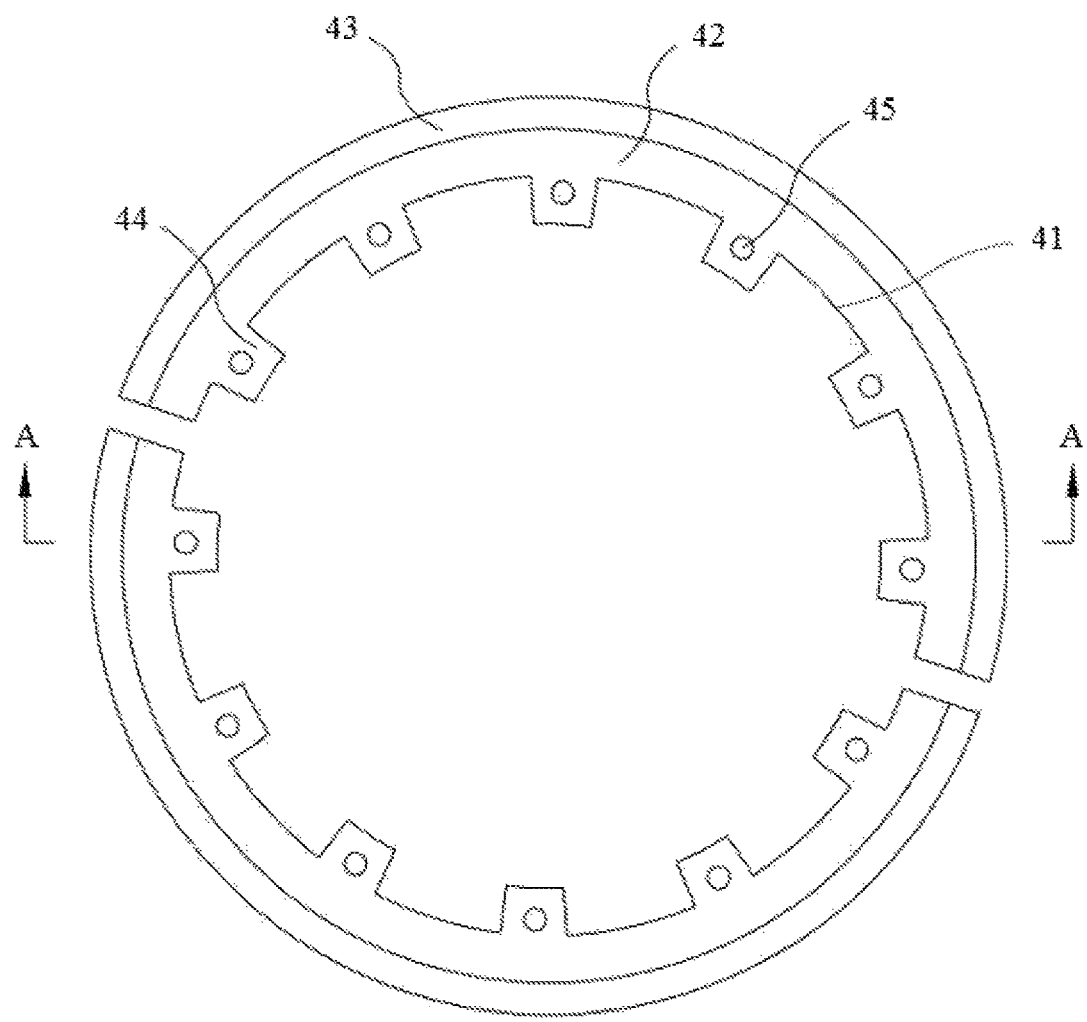
FIG. 6B is a plan view of a connection plate of the pitch apparatus according to the second embodiment of the present disclosure.
Figure 6C:
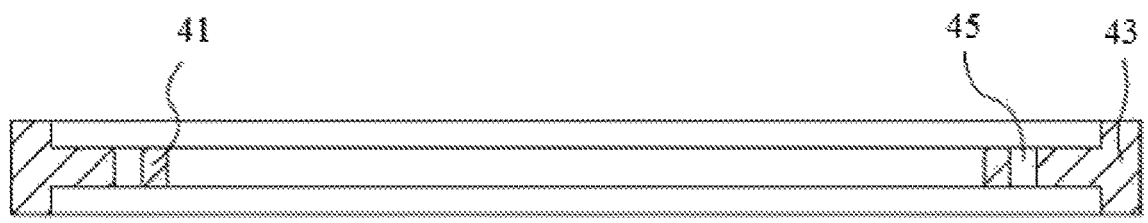
FIG. 6C is a front sectional view of the connection plate of the pitch apparatus according to the second embodiment of the present disclosure.

FIG. 6A is a partial sectional view of a pitch apparatus according to a second embodiment of the present disclosure. FIG. 6B is a plan view of a connection plate of the pitch apparatus according to the second embodiment of the present disclosure. FIG. 6C is a front sectional view of the connection plate of the pitch apparatus, which is cut along the direction A-A as indicated by the arrows in FIG. 6B, according to the second embodiment of the present disclosure.

As shown in FIG. 6A, the pitch apparatus based on the second embodiment of the present disclosure may also include a connection plate. FIGS. 6B and 6C show schematic structural diagrams of the connection plate of the pitch apparatus according to the second embodiment of the present disclosure. According to the second embodiment of the present disclosure, an arrangement position and a structure of a connection plate 40 change, which is different from the pitch apparatus according to the first embodiment. Except the structure of the connection plate 40 and the blade 6, the structure of the pitch apparatus according to the second embodiment of the present disclosure is the same as the structure of the pitch apparatus according to the first embodiment. Therefore, the description of the same part is omitted, only the parts that are different from the first embodiment are described hereinafter.

As shown in FIGS. 6B and 6C, in the second embodiment of the present disclosure, the connection plate 40 may also be a ring-shaped plate and include an inner circumferential portion 41 and an outer circumferential portion 43 and a middle transition portion 42 connecting the inner circumferential portion 41 and the outer circumferential portion 43. The inner circumferential portion 41 of the connection plate 40 is bonded to a position of the blade 6 that is close to a pitch bearing 2. As an example, an inserting groove 61 may be formed on an outer circumferential of a periphery of a blade root of the blade 6, the inner circumferential portion 41 of the connection plate 40 may be inserted into the inserting groove 61 of the blade 6. A bolt hole may be formed on the inner circumferential portion 41. In a case where the inner circumferential portion is inserted into the inserting groove 61 of the blade 6, the connection plate 40 may be pre-embeddedly connected to the inserting groove 61 of the blade root of the blade 6 by the inner race connection bolt 8. A transmission belt 3 is connected to the outer circumferential surface of the connection plate 40 by a pre-tensioning apparatus of the transmission belt, thereby driving a rotation pitch of the driving blade 6.

For a convenience of connecting the connection plate 40 to the outer circumferential of the periphery of the blade root of the blade 6, the connection plate 40 may be formed as multiple arc-segments that joint as a ring or a part of a ring when being installed on the blade root. FIG. 6B shows that the connection plate 40 consists of two arc-segment portions. An inscribed angle of each arc-segment is less than or equal to 180 degrees. Preferably, the connection plate 40 may consist of three to six arc-segment portions, so as to facilitate an installation of the connection plate 40.

The multiple arc-segment portions may be inserted into the inserting groove of the blade root of the blade 6 in a radial direction. Preferably, multiple inserting projections 44 are formed on the inner circumferential portion 41 of the connection plate 40, where the multiple inserting projections 44 extend inwardly in a radial direction and are evenly distributed in a circumferential direction. An axial through hole 45, which is for a bolt connection with the blade 6, may be formed on the inserting projection 44. The multiple inserting projections 44 are embedded and connected to the inserting groove of the blade 6 and are fixedly connected to the blade 6 by a bolt.

In the second embodiment, a connection manner between the connection plate 40 and the blade 6 is not limited to what is shown in Figures. Other manners such as a pin connection, a wedge connection, a lip alignment may also be adopted.

Similar to the connection plate 10 according to the first embodiment of the present disclosure, the outer circumferential portion 43 of the connection plate 40 may also not be a complete ring structure as long as installation requirements and strength requirements are met, the axial thickness of the middle transition portion 42 may be thinner and the lightening hole may be formed in the middle transition portion 42, and the like. In addition, a shape of a cross section that is intercepted in the radial direction of the connection plate 40 may be approximately a shape of "H", "Z", "L" or "T".

Figure 7A:
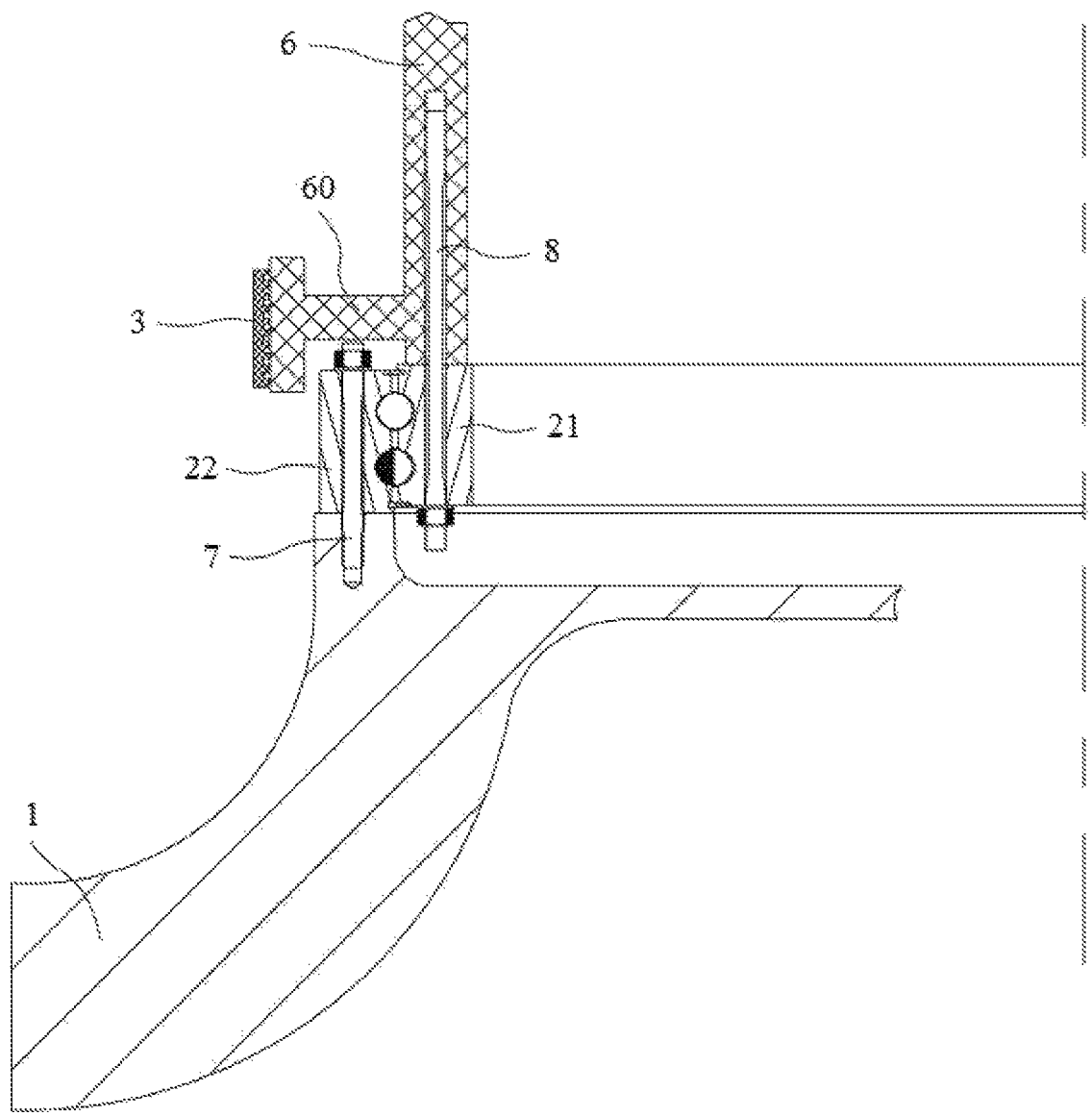
FIGS. 7A and 7B are partial sectional views of a pitch apparatus according to a third embodiment of the present disclosure.
Figure 7B:
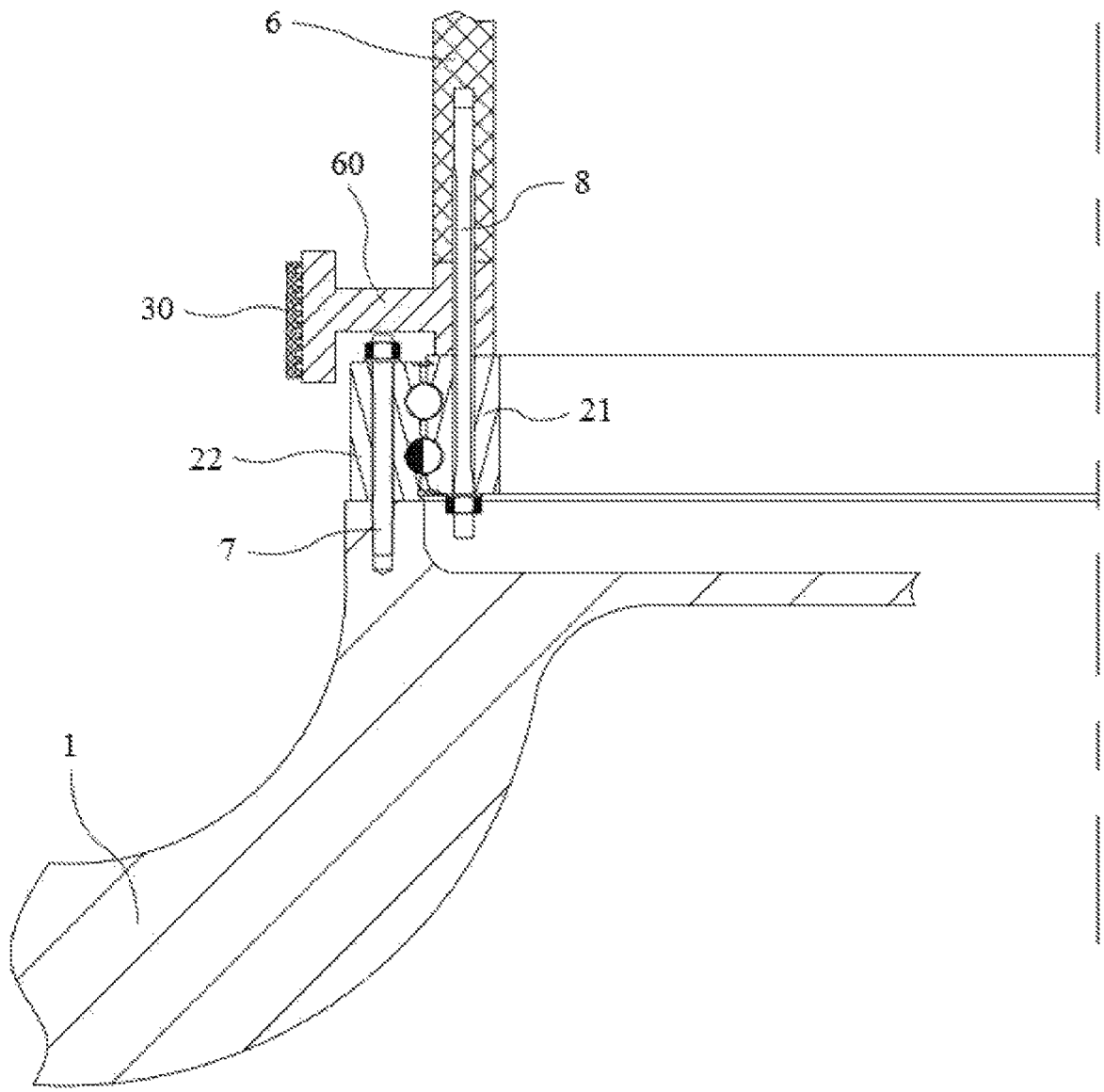

The shape of the connection plate 40 is not limited to the shapes shown in Figures and described above, as long as the outer circumferential surface of the connection plate 40 can meet the mating requirements of the transmission belt, the installation requirements and the strength requirements Third Embodiment FIGS. 7A and 7B show partial sectional views of a pitch apparatus according to a third embodiment of the present disclosure. The pitch apparatus in the third embodiment also includes a connection plate. According to the third embodiment, a connection plate and a blade 6 are an integral structure, which is different from the first embodiment and the second embodiment. That is, an inner circumferential portion and a blade root are integrally formed to be the integral structure. In other words, a projection structure 60, which replaces the connection plate in the first embodiment and the second embodiment, may be integrally formed on an outer circumferential surface of the blade root of the blade 6. Apparently, the projection structure 60 and the outer circumferential surface of the blade root may also be detachable. A transmission belt 3 is connected to an outer circumferential surface of the projection structure by a pre-tensioning device, so as to drive a rotation pitch of the blade 6.

The projection structure 60 may include a radially extending portion extending outwardly in a radial direction from the periphery of the blade root. The transmission belt 3 may be wound around an outer circumferential surface of the radially extending portion. Furthermore, the projection structure 60 may further include an axially extending portion extending in the radial direction from an outer end of the radially extending portion. The transmission belt 3 may be wound around an outer circumferential surface of the axially extending portion.

Similar to the connection plate in the first embodiment and the second embodiment, the projection structure 60 may be ring-shaped or partially ring-shaped, an outer circumferential portion of the projection structure 60 may also be a non-complete ring structure and the lightening hole may be formed in the radially extending portion. The shape of the projection structure 60 may be the same or approximately the same shape as the connection plate 10 shown in FIG. 5 or the connection plate 40 shown in FIG. 6B, which are not described in detail herein.

As shown in FIG. 7A, materials that are the same as materials of the blade may be used to form the projection structure 60 in a manufacture process of the blade 6. As shown in FIG. 7B, in a case where the material of the blade 6 can not meet the strength requirements of a pitch operation, other suitable materials may be selected for manufacturing the blade root and the projection structure 60, thereby meeting the strength requirements.

The shape of the projection structure 60 in the present embodiment is not limited to the shapes shown in Figures, as long as the outer circumferential surface of the projection structure 60 can meet mating requirements of the transmission belt. In order to meet transmission requirements of different transmission belt, a corresponding anti-friction processing or a friction enhancement processing may be performed on the outer circumferential surface of the projection structure 60 to change a friction coefficient of a mating surface. Optionally, the transmission belt 3 may be a toothed belt or a toothed chain. In addition, a toothed structure may be arranged on the outer circumferential surface of the projection structure, so as to match the toothed belt or the toothed chain.

Fourth Embodiment

Figure 8A:
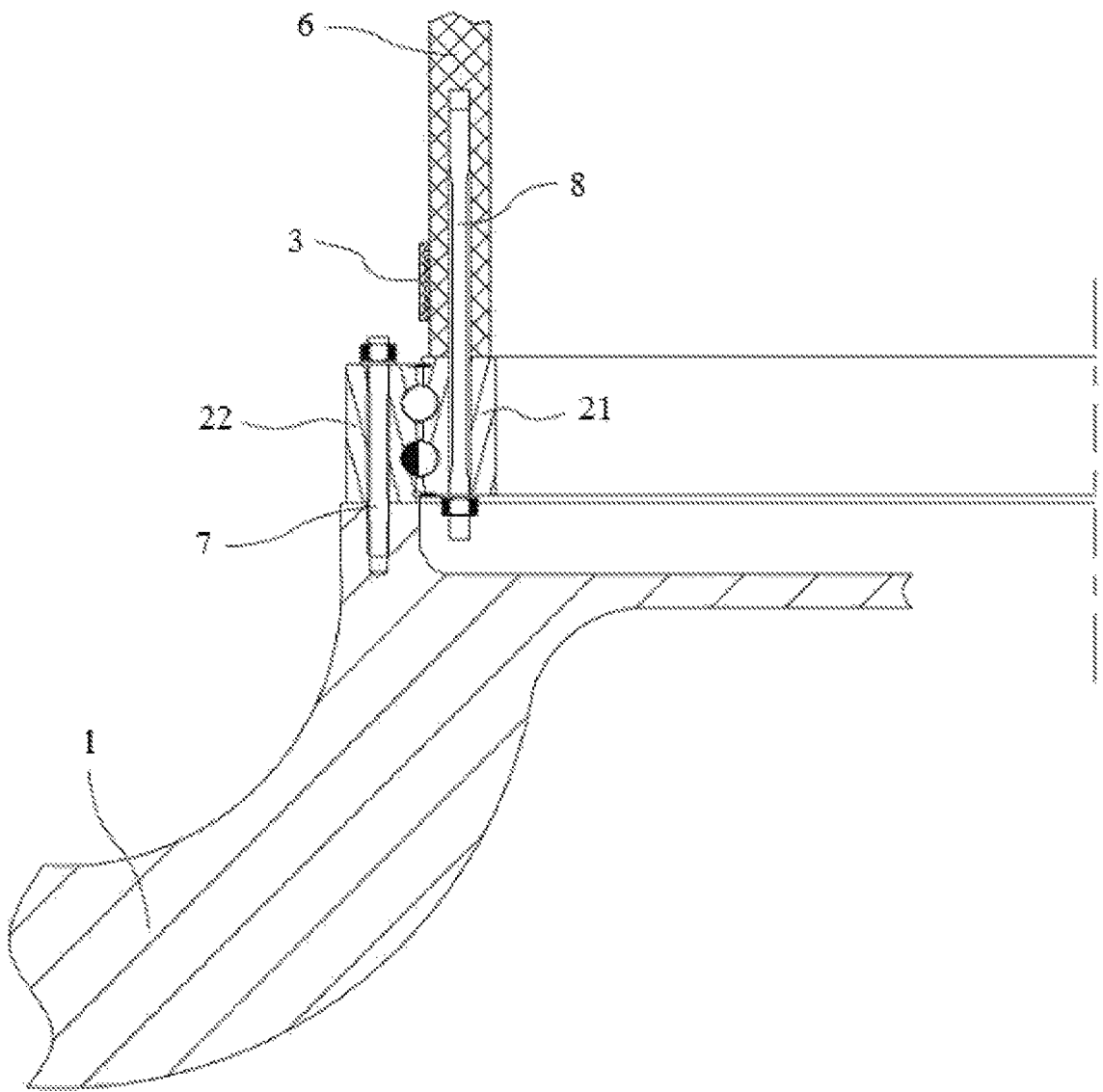
FIGS. 8A and 8B are partial sectional views of a pitch apparatus according to a fourth embodiment of the present disclosure.
Figure 8B:
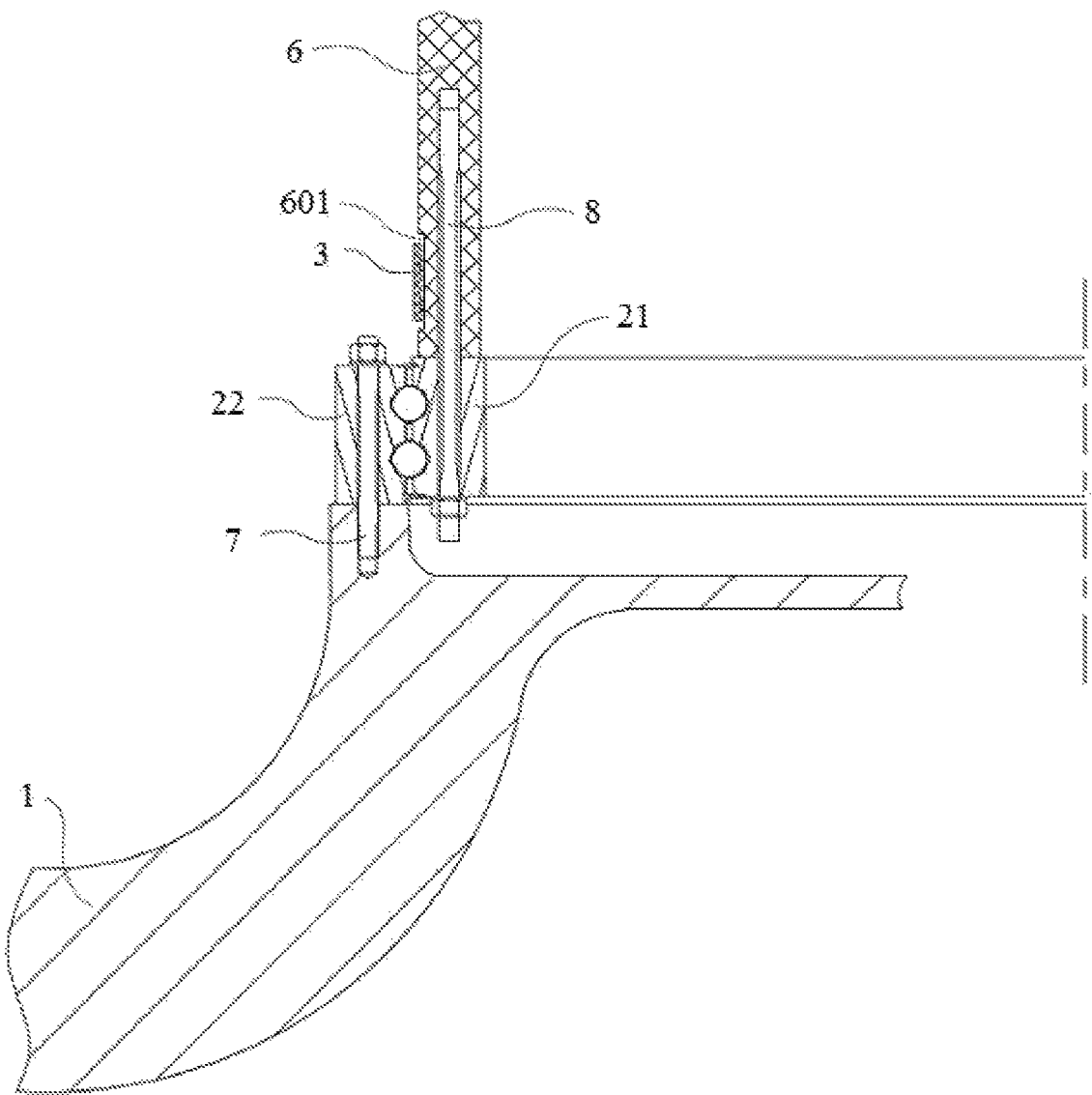

FIGS. 8A and 8B show partial sectional views of a pitch apparatus according to a fourth embodiment of the present disclosure. According to the fourth embodiment of the present disclosure, there is no connection plate, which are different from the first embodiment and the second embodiment according to the present disclosure, and a transmission belt 3 is directly connected to a blade root of a blade 6 by a pre-tensioning device, thereby driving a rotation pitch of the blade 6, which is similar to the third embodiment of the present disclosure. Unlike the third embodiment, a projection structure 60 is not formed on the outer circumferential of the blade root of the blade 6, and the transmission belt is directly wound around the periphery of the blade root.

In order to further limit a mating area of the blade 6 and the transmission belt 3, a groove 601 may be arranged at a mating portion of the blade root and the transmission belt as shown in FIG. 8B, or other similar manners may be adopted, so as to stably arrange the transmission belt 3 in the groove 601 and to prevent a displacement of the transmission belt 3 in an axial direction.

Similarly, a corresponding anti-friction or a friction enhancement processing may be performed on a mating surface of the blade 6 and the transmission belt 3 to change a friction coefficient of the mating surface. The transmission belt 3 may be a toothed belt or a toothed chain. In addition, a toothed structure may be arranged on the outer circumferential surface of the blade 6 to match the toothed belt or the toothed chain.

Fifth Embodiment

Figure 9A:
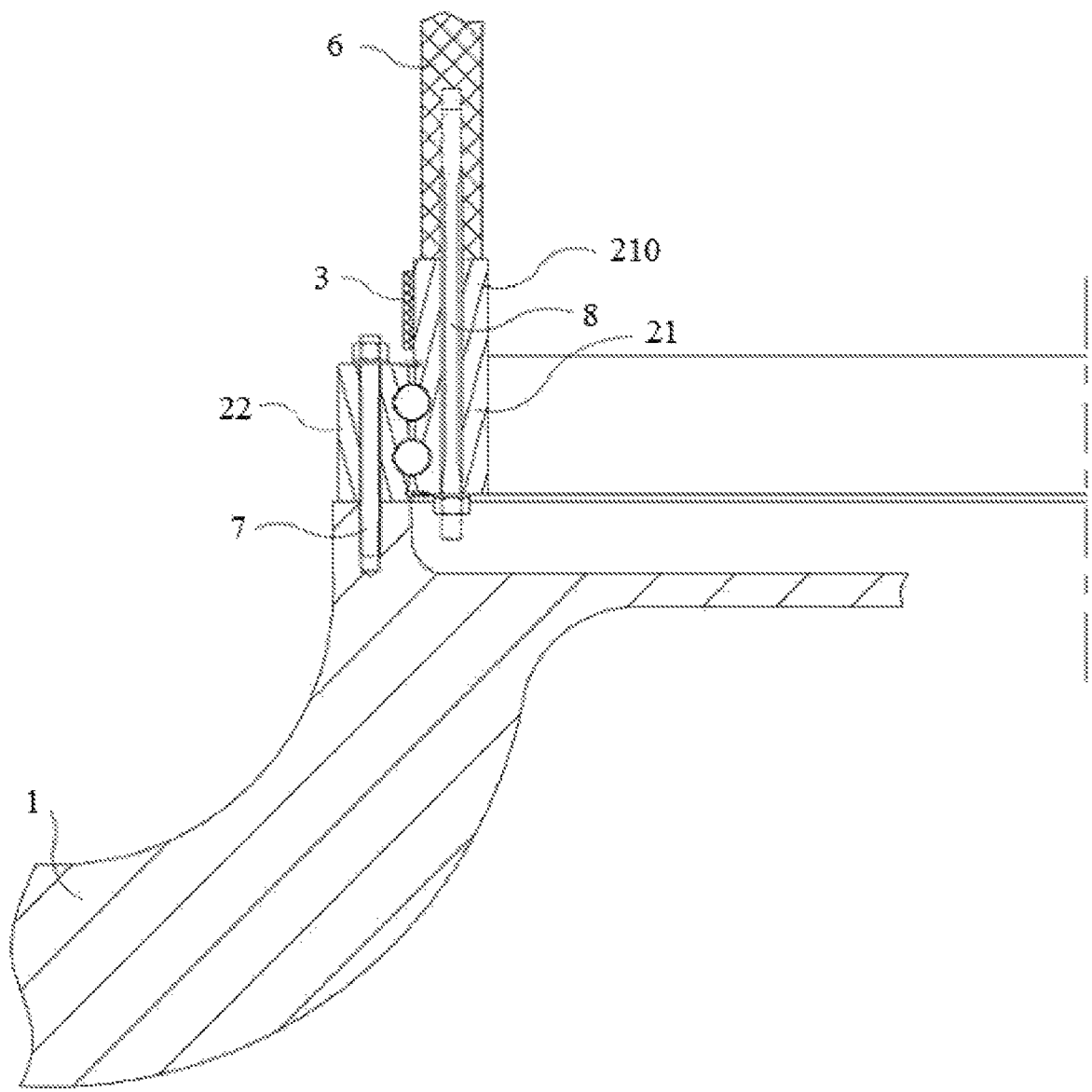
FIGS. 9A and 9B are partial sectional views of a pitch apparatus according to a fifth embodiment of the present disclosure.
Figure 9B:
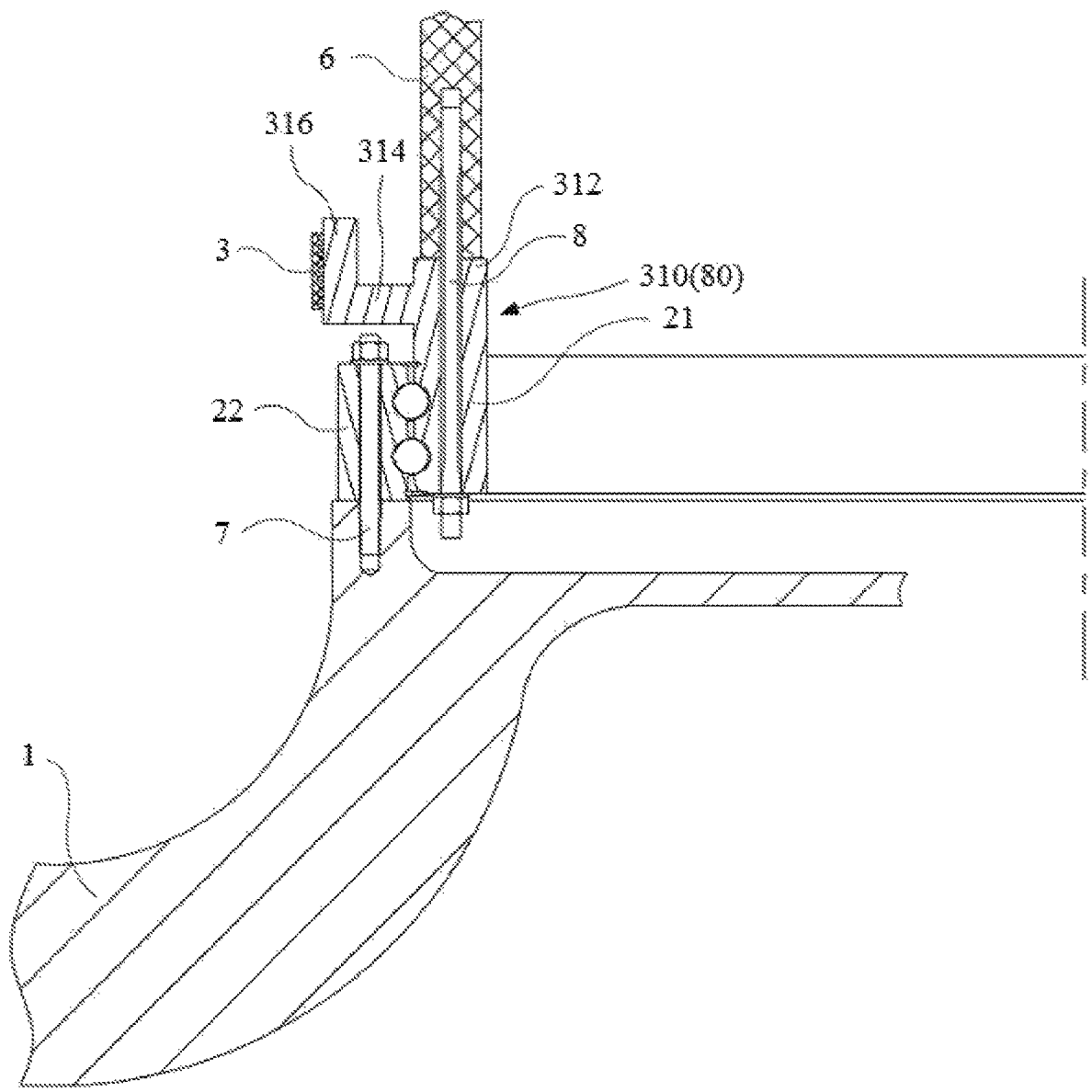

FIGS. 9A and 9B show partial sectional views of a pitch apparatus according to a fifth embodiment of the present disclosure. A bearing inner race 21 of a pitch bearing 2 outwardly extends beyond a bearing outer race 22 for a predetermined length in an axial direction, which is different from the previous embodiments. In other words, an extending portion 210 or 310 is formed on the bearing inner race 21 in an axial direction facing a blade 6, an axial through hole in the bearing inner race 21 also extends and passes through the extending portion 210 or 310, so that a bearing inner race connection bolt 8 may pass through the bearing inner race 21 and the extending portion 210 or 310 and then is fastened to the blade 6, thereby fixedly connecting the blade 6 and the bearing inner race 21.

A transmission belt 3 is connected to an outer circumferential surface of the extending portion 210 or 310 of the bearing inner race 21 by a pre-tensioning device to drive a rotation of the bearing inner race 21. A rotation pitch of the blade 6 is driven by the bearing inner race 21.

As shown in FIG. 9A, the extending portion 210 may extend a predetermined length in the axial direction from the bearing inner race 21, where a shape of the extending portion is generally cylindrical. The predetermined length is greater than a width of the transmission belt 3. For matching with the transmission belt 3, a corresponding processing may be performed on the outer circumferential surface of the extending portion 210. For example, an anti-friction processing or a friction enhancement processing may be performed on the outer circumferential surface. The transmission belt 3 may be a toothed belt or a toothed chain. Therefore, a toothed structure may be formed on the outer circumferential surface so as to be engaged with the toothed belt or the toothed chain.

The extending portion 310 in FIG. 9B is different from the extending portion 210 in FIG. 9A. The extending portion 310 further includes a projection structure on the basis of the extending portion 210 shown in FIG. 9A, so as to further increase a pitch diameter of the transmission belt 3.

As shown in FIG. 9B, the extending portion 310 may include an axially extending portion 312 and a projection structure, and the projection structure is formed on an outer circumferential of the axially extending portion 312.

The projection structure may include a radially extending portion 314 extending outwardly in a radial direction. In this case, the transmission belt 3 may be wound around an outer circumferential surface of the radially extending portion 314. Furthermore, the projection structure may also include a transmission element installation portion 316 extending outwardly in an axial direction from an outer end of the radially extending portion 314, where the transmission belt 3 may be wound around an outer circumferential surface of the transmission element installation portion 316. The projection structure may be formed integrally with the axially extending portion 312, or may be formed as a single component that is inserted into the outer circumferential of the axially extending portion 312, which adopts a similar manner as the connection plate 40 according to the second embodiment. For example, an inner circumferential of the radially extending portion 314 is provided with the inserting projection extending inwardly in the radial direction, a corresponding inserting groove may be formed on the outer circumferential of the axially extending portion 312, so that the projection structure is bonded to the radially extending portion 314 by matching the inserting projection and the inserting groove. Similar to the structure of the connection plate 40 in the previous embodiments, a shape of a cross-section of the projection structure may be a shape of "—", "T" or "L". The projection structure may be ring-shaped or partially ring-shaped. Further, a lightening hole may be formed on the radially extending portion 314.

In other words, the structure of embodiment shown in FIG. 9B may be acquired by forming an integral structure having the connection plate 10 and the bearing inner race 21 according to the first embodiment of the present disclosure. In other words, the pitch apparatus shown in FIG. 9B may also include a connection plate 80, where the connection plate 80 and the bearing inner race 21 are formed integrally. The connection plate 80 includes an inner circumferential portion, an outer circumferential portion and a middle transition portion connecting the inner circumferential portion and the outer circumferential portion, which are arranged in a radial direction. Multiple axial through holes of the bearing inner race 21 extend and pass through the inner circumferential portion.

The structure of the connection plate 80 (i.e. the extending portion 310) shown in FIG. 9B is similar to the structure of the connection plate 10, the structure of the connection plate 40 and the structure of the connection plate 60 described in the previous embodiments, a cross section of the connection plate 80 may be a shape of "H" or "Z". Other structures of the pitch apparatus are similar to the corresponding components of the pitch apparatus described in the previous embodiments, which will not be described herein.

The above five embodiments are described in conjunction with the drawings. It should be understood for those skilled in the art that structural characteristics described in one of the embodiments may also be applied to the other embodiments. The characteristics in the different embodiments may be mutually combined to form other embodiments in a case that there is no conflict among the characteristics. For example, in the embodiment shown in FIG. 8B, the manner that the outer circumferential surface of the blade root is provided with the groove for preventing the displacement of the transmission belt in the axial direction, may also be applied to other components apparently, such as pitch plates and extending portions according to the other embodiments.

The pitch apparatus in the present disclosure may be applied to the wind turbine, therefore, a wind turbine having the pitch apparatus is provided in the present disclosure.

Figure 1:
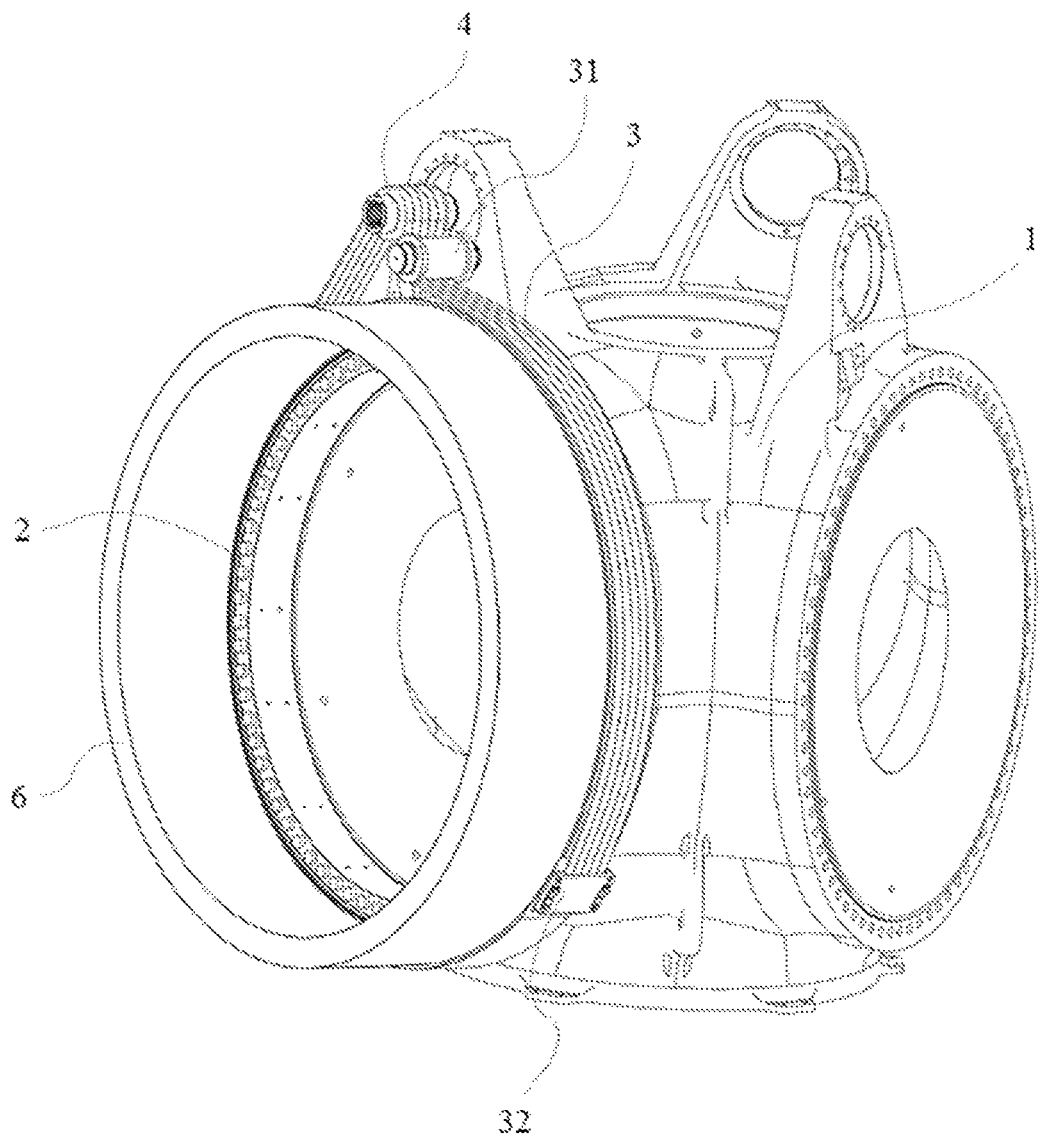
FIG. 1 shows a schematic diagram of a pitch apparatus according to the conventional technology.
Figure 2:
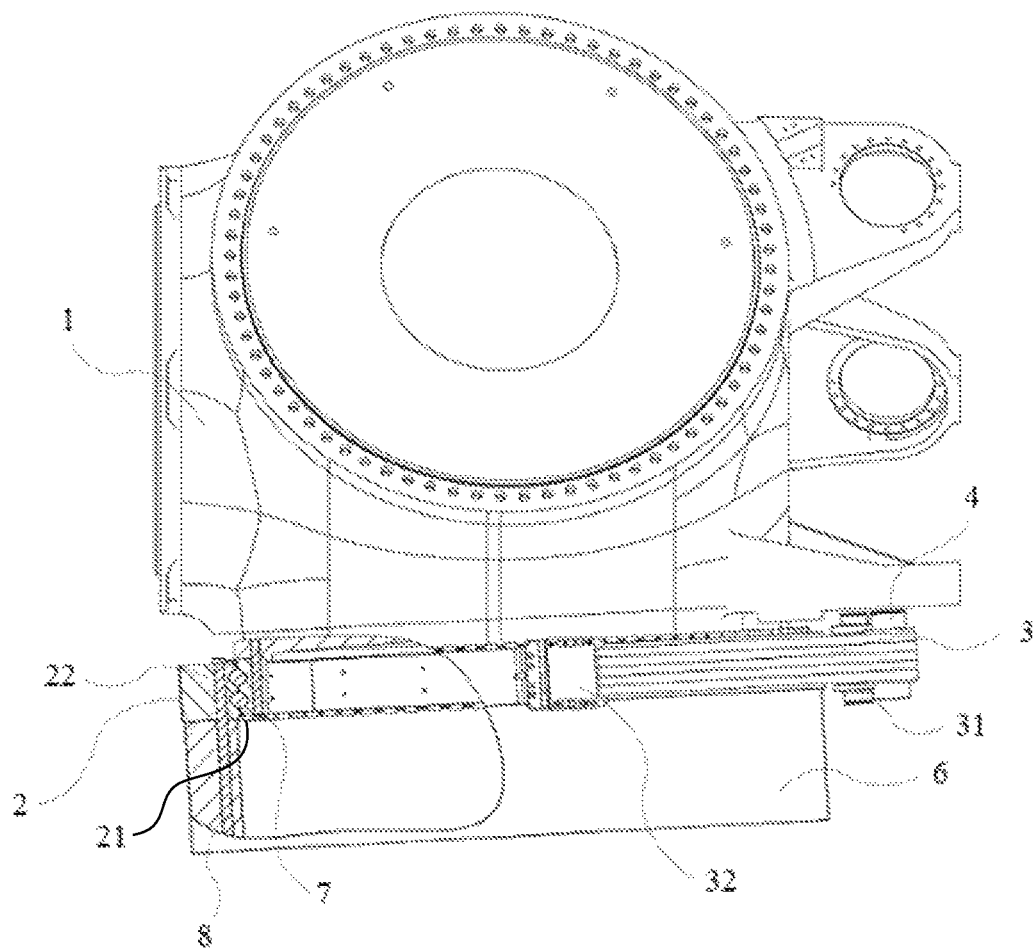
FIG. 2 shows a partial sectional side view of the pitch apparatus according to FIG. 1.

In a case that the blades have a same specification, the blades have a same bending moment. Reference is made to FIGS. 1 and 2, since the blade 6 is connected to the bearing outer race 22 of the pitch bearing 2 in the conventional technology, in the case that the blades have the same specification, the size of the pitch bearing 2 is small. Accordingly, the diameter distribution of the pitch bearing and hub connection bolt 7, the pitch diameter of the bearing steel ball, the diameter of the transmission belt are also small. Since the load is proportional to the bending moment and inversely proportional to the pitch diameter, the load on the steel ball and the load on the bolt are large in a case of the same bending moment, so that the pitch bearing 2 is subjected to a large pitch load in a process of the blade pitch. Therefore, components such as the bolts of the pitch bearing 2 that are connected with the hub 1 and the ball of the pitch bearing 2 are all subjected to a large load, which may easily cause a damage to the pitch bearing 2 itself and the components in the pitch bearing.

According to the pitch apparatus of the wind turbine and the wind turbine having the pitch apparatus of the embodiment of the present disclosure, in a case that the blades have a same specification, by connecting the blade to the bearing inner race, a size of the pitch bearing can be increased accordingly, a pitch diameter of the bolt increases accordingly, the number of bolts increases, and a distribution diameter of the transmission element increases, so that an anti-load capacity of the blade root increases and a load on a single bolt and a load on the bearing roller decrease.

Specifically, according to the pitch apparatus of the wind turbine provided in the embodiment of the present disclosure, a load level of an ultimate bending moment for a blade root increases, a safety factor of the pitch bearing and a safety factor of the connection bolt increase, a safety factor of the pitch bearing inner race, a safety factor of the pitch bearing outer race and a safety factor of the transmission element increase and fracture failure risks of the pitch bearing and the transmission belt are reduced.

The above embodiments are only exemplary and are not intended to limit this disclosure. It should be understood by those skilled in the art that many modifications may be made to the embodiments of the disclosure without departing from the spirit and principles of the disclosure. The scope of the present disclosure is defined by the claims and their equivalents.

The invention claimed is:

1. A pitch apparatus applied in a wind turbine, wherein the wind turbine comprises a wheel hub and a blade;
   wherein the pitch apparatus comprises:
      a pitch bearing;
      a transmission element;
      a connection plate; and
      a driving mechanism for driving the transmission element;
   wherein the pitch bearing comprises;
      a bearing inner race; and
      a bearing outer race;
   wherein the bearing inner race is fixedly connected to the blade, the bearing outer race is fixedly connected to the wheel hub, the transmission element is driven by the driving mechanism, and drives the blade and the bearing inner race to rotate relative to the wheel hub, wherein the connection plate is fixedly connected with and extends outwardly past an outermost circumference of a blade root of the blade in a radial direction of the blade root, and the transmission element is arranged on an outer circumferential surface of the connection plate, the radial direction of the blade root being perpendicular to a pitch axis of the blade.

2. The pitch apparatus according to claim 1, wherein
   the connection plate is arranged between the bearing inner race and the blade; or
   the connection plate is arranged on a periphery of the blade root of the blade.

3. The pitch apparatus according to claim 2, wherein the connection plate comprises the following elements arranged in a radial direction:
   an inner circumferential portion;
   an outer circumferential portion; and
   a middle transition portion connecting the inner circumferential portion and the outer circumferential portion.

4. The pitch apparatus according to claim 3, wherein the inner circumferential portion is a ring and comprises a plurality of first axial through holes arranged in a circumferential direction; wherein the bearing inner race comprises a plurality of second axial through holes corresponding to the plurality of first axial through holes; wherein a bearing inner race connection bolt is fastened to the blade through one of the plurality of second axial through holes and one of the plurality of first axial through holes in the sequence listed.

5. The pitch apparatus according to claim 3, wherein the connection plate is ring-shaped or partially ring-shaped, wherein the inner circumferential portion is fixed to the periphery of the blade root of the blade.

6. The pitch apparatus according to claim 5, wherein the inner circumferential portion is provided with a plurality of inserting projections extending inwardly in the radial direction, the periphery of the blade root of the blade is provided with a plurality of inserting grooves, and each of the plurality of inserting projections is fixed into a respective one of the plurality of inserting grooves.

7. The pitch apparatus according to claim 5, wherein the connection plate consists of a plurality of arc-segment portions, a circumferential angle of the plurality of arc-segment portions each is less than or equal to 180°.

8. The pitch apparatus according to claim 3, wherein the connection plate comprises at least one of the following structural characteristics:
   an axial thickness of the middle transition portion is less than or equal to an axial thickness of the outer circumferential portion;
   a plurality of lightening holes is formed on the middle transition portion;
   the outer circumferential portion is ring-shaped or partially ring-shaped, or the outer circumferential portion and the middle transition portion are ring-shaped or partially ring-shaped; and
   a toothed structure is formed on the outer circumferential surface of the connection plate.

9. The pitch apparatus according to claim 3, wherein the outer circumferential portion comprises an axially extending portion.

10. The pitch apparatus according to claim 9, wherein a lightening hole is arranged in the middle transition portion.

11. The pitch apparatus according to claim 3, wherein a radial cross-section of the outer circumferential portion is T-shaped or L-shaped.

12. The pitch apparatus according to claim 3, wherein the connection plate is formed integrally with the blade.

13. The pitch apparatus according to claim 12, wherein the outer circumferential portion comprises an axially extending portion.

14. The pitch apparatus according to claim 3, wherein the connection plate is formed integrally with the bearing inner race.

15. The pitch apparatus according to claim 14, wherein the outer circumferential portion comprises an axially extending portion.

16. The pitch apparatus according to claim 1, wherein the connection plate is formed integrally with the blade.

17. The pitch apparatus according to claim 16, wherein the connection plate is ring-shaped or partially ring-shaped.

18. The pitch apparatus according to claim 1, wherein the connection plate is formed integrally with the bearing inner race.

19. The pitch apparatus according to claim 18, wherein the connection plate is ring-shaped or partially ring-shaped.

20. A wind turbine, comprising a pitch apparatus, a wheel hub and a blade, wherein the pitch apparatus comprises:

a pitch bearing;
a transmission element;
a connection plate; and
a driving mechanism for driving the transmission element;
wherein the pitch bearing comprises:
a bearing inner race; and
a bearing outer race;
wherein the bearing inner race is fixedly connected to the blade, the bearing outer race is fixedly connected to the wheel hub, the transmission element is driven by the driving mechanism, and drives the blade and the bearing inner race to rotate relative to the wheel hub,
wherein the connection plate is fixedly connected with and extends outwardly past an outermost circumference of a blade root of the blade in a radial direction of the blade root, and the transmission element is arranged on an outer circumferential surface of the connection plate, the radial direction of the blade root being perpendicular, to a pitch axis of the blade.

* * * * *